C. ROBNETT.
TRACTOR CLEAT.
APPLICATION FILED NOV. 19, 1920.
1,422,377.
Patented July 11, 1922.
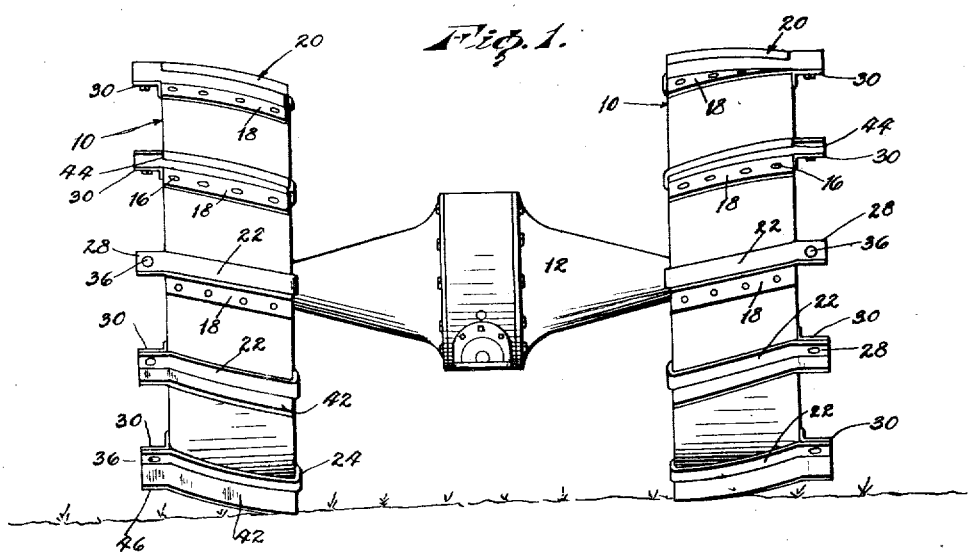
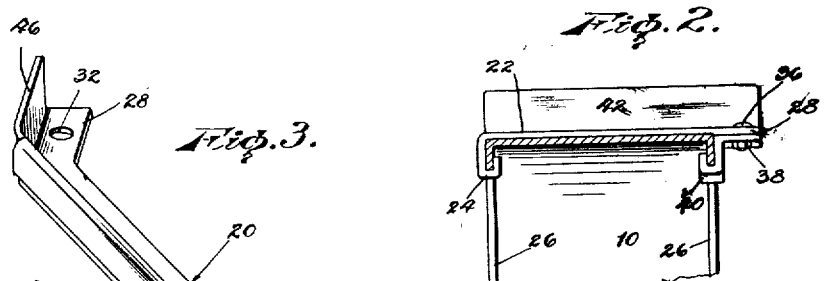
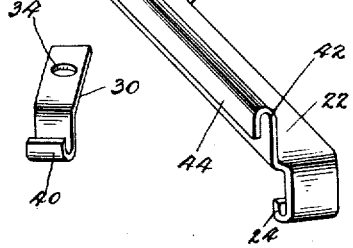
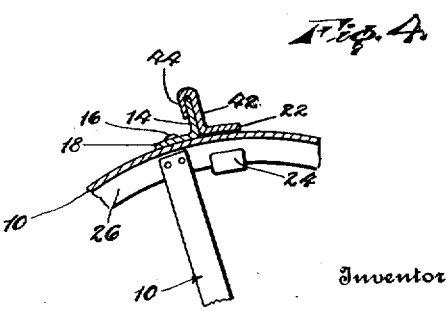
Inventor
C. Robnett.
By Lacey & Lacey, Attorneys

UNITED STATES PATENT OFFICE.

CURTISS ROBNETT, OF COLUMBIA, MISSOURI.

TRACTOR CLEAT.

1,432,377.　　　Specification of Letters Patent.　　Patented July 11, 1922.

Application filed November 19, 1920. Serial No. 425,148.

*To all whom it may concern:*

Be it known that I, CURTISS ROBNETT, a citizen of the United States, residing at Columbia, in the county of Boone and State of Missouri, have invented certain new and useful Improvements in Tractor Cleats, of which the following is a specification.

This invention relates to improvements in tractors and more particularly to a traction attachment for the power transmitting wheels.

An important object of this invention is to provide an attachment for tractor wheels which may be applied to the cleats so as to increase the traction of the wheels to an extent sufficient to permit the tractor to operate in soft ground and so forth.

A further object of the invention is to provide an attachment of the class described which may be applied to tractors without in any way changing the structure or removing any of the parts of the power transmitting wheels.

The invention forming the subject matter of this application aims also to provide a tractor attachment for tractor wheels which extends beyond the sides of the wheels so as to act as a pulverizer upon engaging the ground.

A further object of the invention is to provide an attachment of the class described which may be conveniently and quickly applied and which is cheap to manufacture.

Other objects and advantages of the invention will be apparent during the course of the following description.

In the accompanying drawing, forming a part of this application, and in which like numerals are employed to designate like parts throughout the same:

Figure 1 is an elevation of a pair of tractor wheels having the attachment applied.

Figure 2 is a detail sectional view through a tractor wheel, the view illustrating the application of the attachment.

Figure 3 is a group perspective of the auxiliary cleat forming the subject matter of this application.

Figure 4 is a transverse sectional view through the attachment applied.

In the drawing, wherein for the purpose of illustration is shown a preferred embodiment of the invention, the numeral 10 designates a pair of traction wheels which are operated from the engine of a tractor. The power is, of course, transmitted from the engine to the tractor wheels 10 through axles which are located within an axle housing 12.

The traction wheels 10 are provided with the usual diagonally extending cleats 14 which, under ordinary circumstances, are sufficient to provide a driving connection between the wheels and the ground. The cleats 14 are, as illustrated in Figure 4, secured to the ground engaging surfaces of the wheels by means of rivets 16 which are extended through the rim of the wheel and through base plates 18.

The extension cleat forming the subject matter of this application is designated by the numeral 20 and comprises a base plate 22 which is adapted to lie flatly in contact with the periphery of the traction wheel at one side of the cleat 14. One end portion of the base plate 22 is extended angularly and is formed with a hook 24 which is adapted to engage one of the inwardly extending annular flanges 26 of the traction wheel 10.

The other end portion of the base plate 22 is extended angularly beyond the side of the wheel as indicated at 28 and is adapted for connection with an attaching clip 30. The extension 28 of the base plate 22 and the clip 30 are provided with openings 32 and 34 respectively, which receive a fastening bolt 36 having threaded engagement with a nut 38. The attaching clip 30 is provided with a hook 40 which engages the adjacent inwardly extending annular flange 26 of the traction wheel so as to securely hold the base plate 22 in engagement with the ground engaging surface of the wheel.

An upstanding traction plate 42 is formed along one edge of the base plate 22 and lies flatly in contact with the adjacent side of the cleat 14. The outer longitudinal edge portion of the traction plate 42 is doubled upon itself to form an anchoring flange 44 which overhangs the cleat 14 so as to hold the base plate and the traction plate against circumferential movement with relation to the wheel. One end portion of the traction plate 42 is extended angularly as indicated at 46 and terminates beyond the side of the wheel so as to provide ample traction between the wheel and the ground. The extensions 28 and 46 are arranged parallel to the axis of the traction wheel so as to engage the ground simultaneously with the engagement of the major portion of the traction plate 42. In this manner, no excessive strain is imparted to the extensions 28 and 46.

In applying the improved auxiliary or extension cleat, the anchoring flange 44 is arranged on one side of the cleat 14 while the traction plate 42 is arranged on the other side of the cleat. The hook 24 is, of course, first engaged with one of the flanges 26 and when the base plate 22 is flatly engaged with the periphery of the wheel, the clip or attaching hook 30 is connected to the extended portion 28 of the base plate through the medium of the bolt 36. By reason of this construction, the attachment may be secured to the traction wheel without removing any of the parts of the traction wheel or without drilling holes or the like in the traction wheel. Therefore, the device may be applied to the wheel in a comparatively short time and may also be removed in a short time.

Having thus described the invention, what is claimed as new is:

1. The combination with a traction wheel and cleats thereon, of auxiliary cleats each lying against and engaging over one of the traction wheel cleats, the auxiliary cleats projecting laterally beyond one side of the traction wheel, and anchoring devices associated with the ends of the auxiliary cleats and engaging the opposite side edges of the traction wheel.

2. An auxiliary cleat for tractors comprising a base plate adapted to lie flatly in contact with the periphery of a traction wheel, a traction plate formed along one edge of said base plate, anchoring means associated with said base plate and engaging one edge of the traction wheel, and attaching means associated with said base plate and engaging the opposite edge of the traction wheel.

3. An auxiliary cleat for tractors comprising a base plate, a traction plate formed along one longitudinal edge of said base plate and having one end portion extended angularly, an anchoring flange formed along one longitudinal edge of said traction plate, and attaching devices associated with the ends of said base plate.

4. An auxiliary cleat for tractors comprising a base plate, a traction plate formed along one longitudinal edge of said base plate, an anchoring flange formed along one longitudinal edge of said traction plate and adapted to overhang and contact with the main cleat of a traction wheel, and hooks carried by the ends of said base plate, one of said hooks being detachable.

5. An auxiliary cleat for tractors comprising a base plate, a traction plate carried by said base plate, one end portion of said base plate and said traction plate being extended angularly and adapted to extend over the side of a tractor wheel, a hook detachably connected to the extended portion of said base plate, and a second hook connected to the other end portion of said base plate.

In testimony whereof I affix my signature.

CURTISS ROBNETT. [L. S.]